United States Patent [19]
Ikeda

[11] Patent Number: 5,866,843
[45] Date of Patent: Feb. 2, 1999

[54] WIRE SHIELD STRUCTURE

[75] Inventor: Tomohiro Ikeda, Shizouka, Japan

[73] Assignee: Yazaki Corporation, Tokyo, Japan

[21] Appl. No.: 856,976

[22] Filed: May 15, 1997

[30]  Foreign Application Priority Data

May 16, 1996 [JP] Japan .................................. 8-121664

[51] Int. Cl.⁶ .............................. H01B 7/34; H01B 11/06
[52] U.S. Cl. ................................................ 174/36; 174/78
[58] Field of Search ............................ 174/36, 78, 74 A, 174/109; 439/98, 99; 29/862, 871, 516, 517, 518

[56]  References Cited

U.S. PATENT DOCUMENTS

| | | | |
|---|---|---|---|
| 1,966,929 | 7/1934 | Kellems | 174/135 X |
| 4,256,359 | 3/1981 | Storck | 174/78 X |
| 4,281,211 | 7/1981 | Tatum et al. | 174/36 |
| 4,791,236 | 12/1988 | Klein et al. | 174/36 |
| 5,473,117 | 12/1995 | Morgan et al. | 174/78 |

FOREIGN PATENT DOCUMENTS

| | | | |
|---|---|---|---|
| 56-158627 | 11/1981 | Japan | H02G 3/04 |
| 62-152629 | 9/1987 | Japan | H02G 3/04 |
| 1-121998 | 8/1989 | Japan | H05K 9/00 |
| 3-128998 | 12/1991 | Japan | H05K 9/00 |

*Primary Examiner*—Dean A. Reichard
*Attorney, Agent, or Firm*—Sughrue, Mion, Zinn, Macpeak & Seas, PLLC

[57]  ABSTRACT

A wire shield structure and a wire shielding method which achieve electromagnetic shielding, and reduce the number of component parts so as to enhance the efficiency of an assembling operation. In the wire shield structure, wires are covered with a shield member formed by laminating a metal foil layer and an insulating layer together, and the wires are led out of the shield member, and is connected to desired equipment. An extension portion of the shield member is folded, with the metal foil layer disposed at the inner side, to form a lead wire portion, and a distal end portion of the lead wire portion is folded back, with the metal foil layer exposed, to form an earth terminal for grounding purposes. Therefore, without the use of a separate lead wire, the shielding effect can be enhanced, and the number of the component parts can be reduced.

4 Claims, 8 Drawing Sheets

WIRE SHIELD STRUCTURE

BACKGROUND OF THE INVENTION

1. Field of the Invention

This invention relates to a wire shield structure and a wire shielding method suitably used to shield a wire harness or the like installed in an automobile.

2. Background

With the development of automatic operations, audio and visual equipments and a navigation device are mounted on a current automobile, and naturally many wire harnesses, interconnecting the electronic equipment, and many power cords are used. Travel control signals and so on are in the digital form, and therefore these signals can be easily affected by electrical noises, and when such electrical noises are superimposed on the control signal, an accident is liable to occur.

Therefore, electromagnetic shielding, described below, has been effected in order to prevent the influence of electrical noises and also to prevent radiation of electrical noises.

A zipper tube, having a shielding effect, is disclosed in Unexamined Japanese Utility Model Publication No. Sho. 56-158627. This will briefly be described with reference to FIGS. 10 and 11. A metal foil 32 for shielding purposes is secured to a flexible, sheet-like insulating member 31, and fastening portions 31a and 31b are formed respectively at opposite ends of the insulating member 31, and a drain wire 33 is sewn to the metal foil 32 by a metal strand wire 34.

Figure 11:
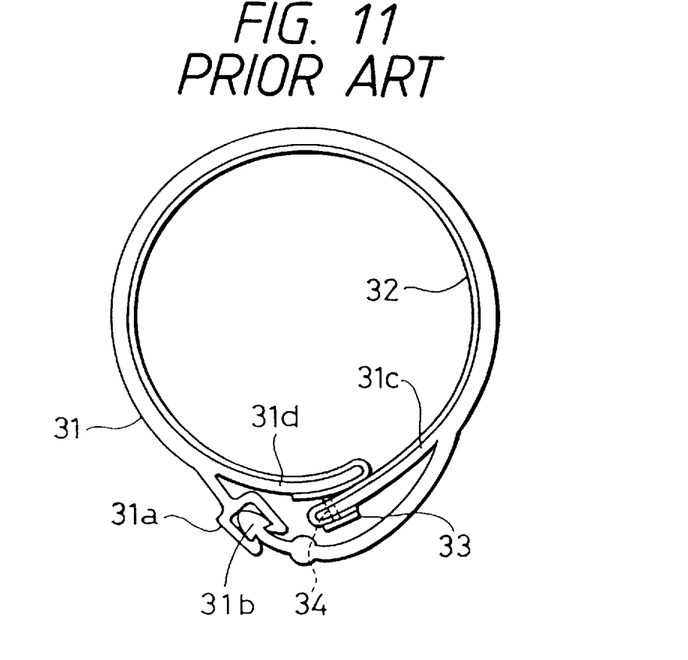
FIG. 11 is a side-elevational view showing the shield structure of FIG. 10 in use.

In use, the shielding metal foil 32 and the sheet-like insulating member 31 are wound on a wire harness (a bundle of wires), not shown, and extension portions 31c and 31d of the insulating member are caused to overlap each other as shown in FIG. 11, and the fastening portions 31a and 31b are fastened together outside of these extension portions, thereby attaching the zipper tube to the wire harness. Then, the drain wire 33 and the metal strand wire 34 are grounded, thereby shielding the wire harness.

Unexamined Japanese Utility Model Publication No. Hei. 1-121998 discloses a cable protector having a shielding effect. This will briefly be described with reference to FIG. 12. A resin band 41 is spirally wound on a bundle of wires 42, and a shielding aluminum foil is affixed to an inner surface of the resin band 41 (which is to be contacted with the bundle of wires 42) over an entire length thereof. A plurality of mounting holes 43 are formed through the resin band 41, and are spaced a predetermined distance from one another along the length of the resin band 41.

Figure 12:
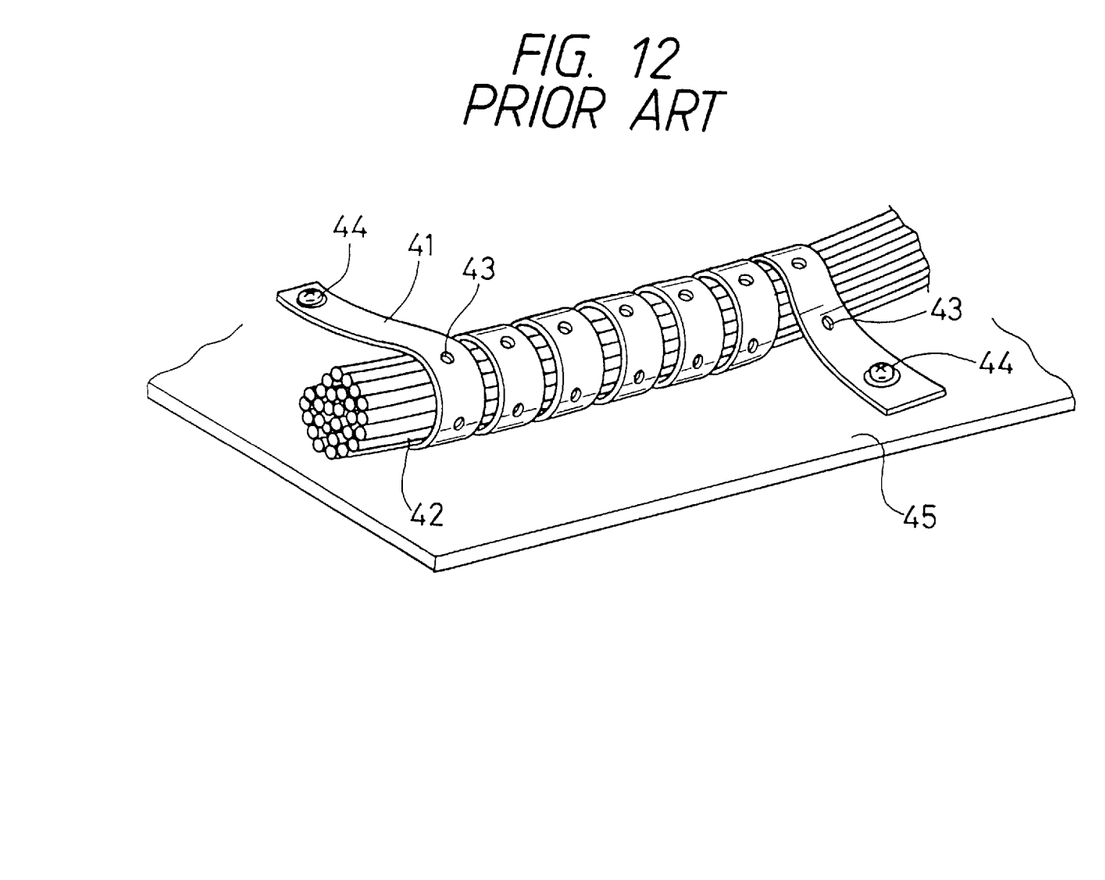
FIG. 12 is a perspective view showing a second example of conventional electromagnetic shield structure.

In use, the resin band 41 is wound on the bundle of wires 42, with the aluminum foil contacted with this wire bundle, and the resin band 41 is cut into a required length, and the resin band 41 is fastened to a chassis 45 by screws 44 passing respectively through the mounting holes 43 provided respectively at opposite ends of the resin band 41. As a result, the aluminum foil is connected to the chassis 45, and therefore the wires 42 are shielded by the aluminum foil, and are fixed to the chassis 45.

Unexamined Japanese Utility Model Publication No. Sho. 62-152629 discloses a wire covering material having a shielding effect as described above. This wire covering material includes a metal foil contained in a long, spiral insulating member, and in use, the insulating member is wound on wires. The metal foil is grounded using a grommet driven into the insulating member to contact the metal foil, an earth wire connected to this grommet, and an earth terminal connected to this earth wire.

Unexamined Japanese Utility Model Publication No. Hei. 3-128998 discloses an electromagnetic shield member for wiring which has a shielding effect. This electromagnetic shield member for wiring includes an electromagnetic shield element (which is in the form of a copper wire net) provided in a flat, spiral tube made of vinyl chloride or the like, and one end of this electromagnetic shield element is extended from the spiral tube, and is connected to an earth connection terminal.

In use, the spiral tube is wound on a bundle of wires, and the earth connection terminal is fixedly connected to a chassis or the like by a screw, thereby effecting the electromagnetic shielding.

Figure 13:
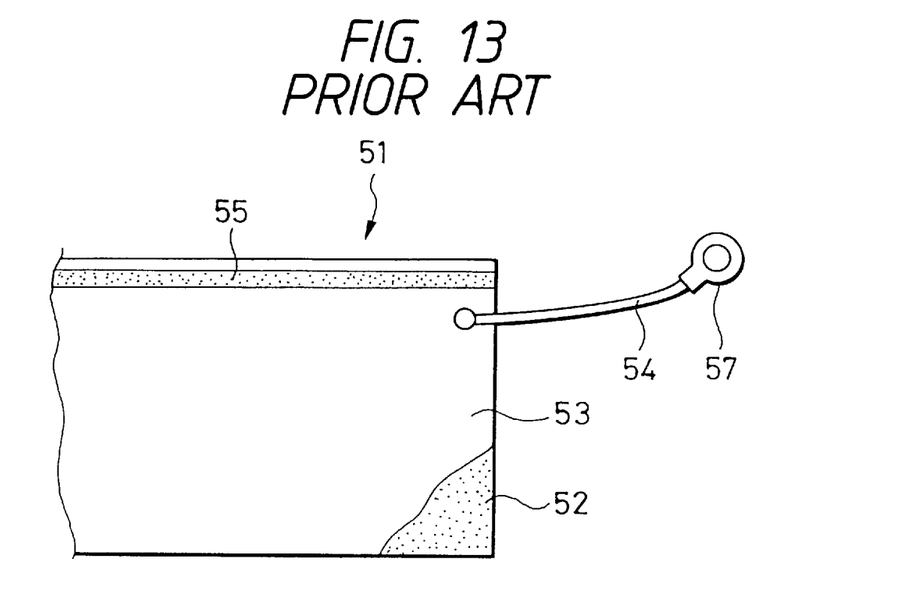
FIG. 13 is a perspective view showing a third example of conventional electromagnetic shield structure.
Figure 14:
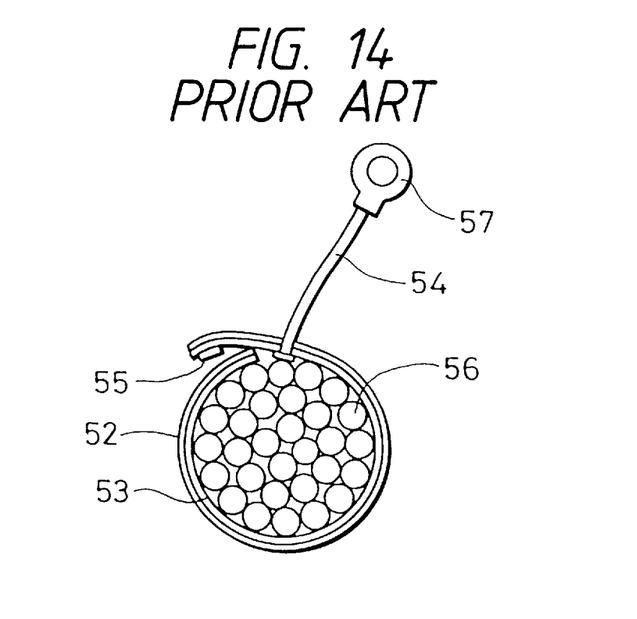
FIG. 14 is a side-elevational view of the shield structure of FIG. 13 in use.

In addition to the above shield structures, a shield structure of a construction as shown in FIGS. 13 and 14 is known. In this shield structure 51, an insulating layer 52 and a metal foil layer 53 are connected together in layers, and an earth wire 54 is connected to the metal foil layer 53, and a band-like adhesive layer 55 is formed on the surface of the metal foil layer 53. In use, this shield structure is wound on a bundle of wires 56 as shown in FIG. 14, and holds this wire bundle by the adhesive layer 55. Then, an earth terminal 57, connected to the earth wire 54, is fixedly secured to a chassis or the like by a screw, thereby grounding the metal foil layer 53 so as to shield the wires 56 from electromagnetic waves.

However, the above-mentioned wire shield structures have the following problems.

Figure 10:
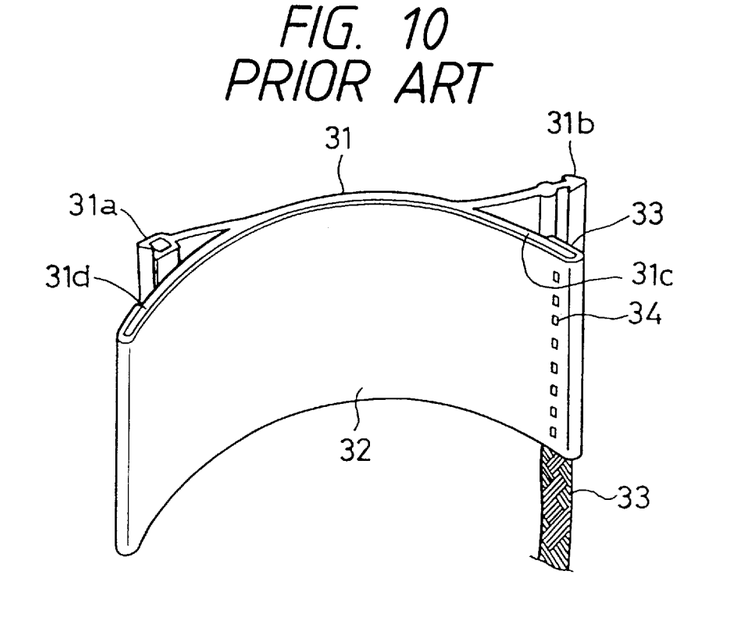
FIG. 10 is a perspective view showing a first example of conventional electromagnetic shield structure.

Each of the zipper tube shown in FIGS. 10 and 11, the wire shield structure 51 shown in FIGS. 13 and 14 and the wire covering material disclosed in Unexamined Japanese Utility Model Publication No. Sho. 62-152629 has the earth wire, and the joint between the metal foil and the earth wire is liable to be destroyed by an external force. And besides, the number of the component parts is large, and the time and labor required for the assembling operation are increased, and this increases the manufacturing cost.

Moreover, there is encountered a serious problem that the use of the earth wire adversely affects the shielding performance. Incidentally, in a test in which there was used an earth wire having a diameter of 0.5 mm$^2$ and a length of 200 mm, and the degree of attenuation was measured varying the frequency (500 KHz, 1 MHz, 2 MHz), the attenuation of only about 16 dB was achieved.

When the length of the earth wire was reduced into 50 mm, the attenuation was improved to 23 to 24 dB, and therefore it has become clear that the length of the earth wire is an important factor in the improvement of the shield effect.

In the cable protector shown in FIG. 12 and the electromagnetic shield member for wiring disclosed in Unexamined Japanese Utility Model Publication No. Hei. 3-128998, part of the metal foil serves as an earth wire, and the metal foil, when exposed, is liable to be damaged, and when such damage occurs, the shielding performance is degraded.

And besides, if the reverse surface facing away from the grounding surface is connected when grounding the metal foil, the metal foil fails to be grounded, and in this case the shielding effect is not obtained.

In the case of the cable protector shown in FIG. 12, the shielded wire bundle has those portion which are not actually shielded, and the wires are liable to be affected by noises due to electromagnetic waves, and also there is a risk that the noises are radiated, and therefore the satisfactory electromagnetic shielding is not obtained.

SUMMARY OF THE INVENTION

It is an object of the invention to provide a wire shield structure and a wire shielding method which have an excellent electromagnetic shielding effect, and reduce the number of component parts so as to enhance the efficiency of an assembling operation.

The above problems can be overcome by a wire shield structure described in the following paragraphs (1) and (2):

(1) A wire shield structure in which a wire is covered with a shield member having a metal foil layer laminated on an insulating layer, and the metal foil layer is grounded, thereby shielding the wire from electromagnetic waves; the shield member is formed into a band-like shape, and includes the metal foil layer and the insulating layer which are laminated together; the wire is covered with the shield member in such a manner that the wire extend along the shield member; the wire is led out from a desired portion of the shield member; one end portion of the shield member is folded back in such a manner that part of the metal foil layer is exposed; and the exposed portion is grounded as an earth terminal, thereby effecting the electromagnetic shielding of the wire.

(2) The above wire shield structure in which that portion of the shield member, extending from the wire lead-out portion to the earth terminal, is folded in a longitudinal direction, with the metal foil layer disposed at the inner side, to form a lead wire portion integral with the metal foil layer.

Further, the above problems can be overcome by a method of shielding a wire described in the following paragraphs (3) to. (5):

(3) A method of shielding a wire from electromagnetic waves, including the steps of: providing a shield member, including an insulating layer and a metal foil layer laminated on the insulating layer, and formed into a band-like shape; positioning the wire on the metal foil layer in a longitudinal direction of the shield member; circumscribing the wire partially by the shield member; leading the wire out from the shield member at a desired position; folding back a distal end portion of the shield member led the wire out in a width direction to expose a part of the metal foil layer; folding the shield member led the wire out in the longitudinal direction of the shield member; and grounding the exposed portion of the shield member.

(4) The above method of shielding the wire, further including the step of forming a hole in the exposed portion before the grounding step.

(5) The above method of shielding the wire, in which the grounding step includes the step of fixing the exposed portion to a grounded body by a fixing member through the hole.

According to the wire shield structure of the above construction and the above method of shielding the wire, the wire is covered with the shield member, with the metal foil layer disposed at the inner side, and the lead wire portion is folded back in the longitudinal direction, with the metal foil layer disposed at the inner side. Then, the end portion of the shield member is folded back in such a manner that the metal foil layer is exposed at the opposite sides, and this exposed portion forms the earth terminal for grounding purposes.

Therefore, the lead wire portion, as well as the earth terminal, is integral with the metal foil layer, and the shielding effect can be enhanced, and besides since either surface of the earth terminal may be connected for grounding purposes, an incomplete electromagnetic shielding due to an erroneous connection can be prevented.

DETAILED DESCRIPTION OF THE PREFERRED EMBODIMENT

Figure 1:
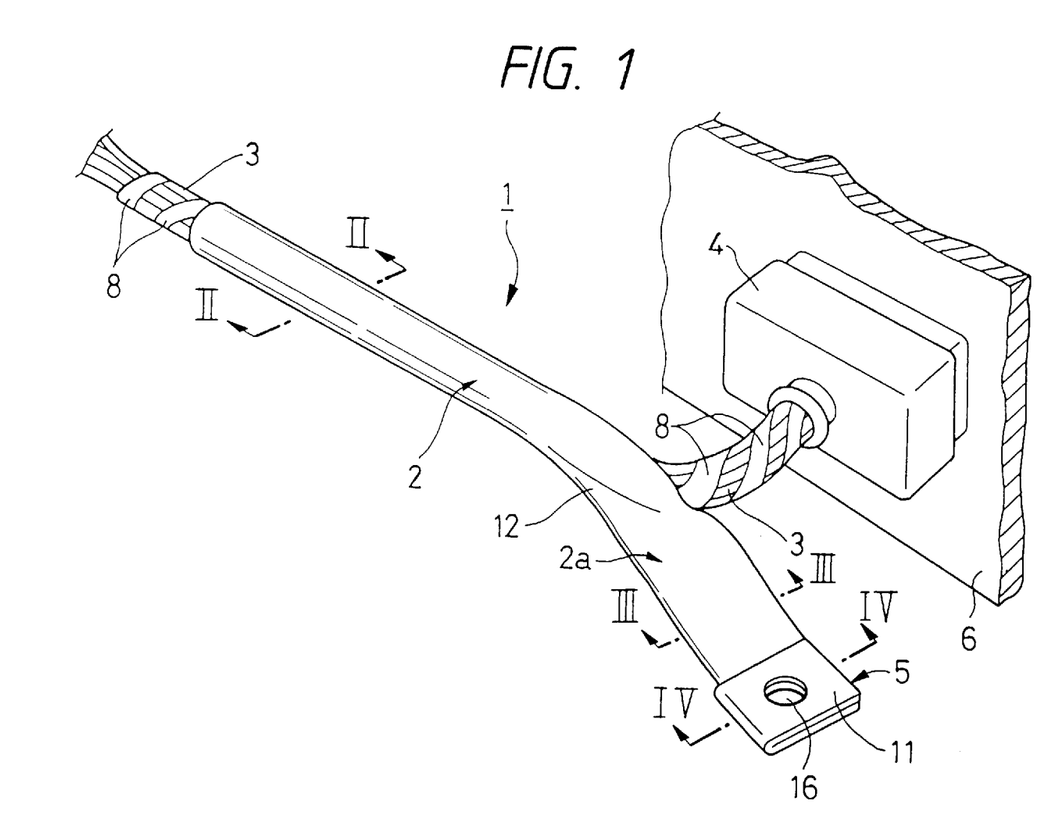
FIG. 1 is a perspective view showing a preferred embodiment of a wire shield structure of the present invention.
Figure 2:
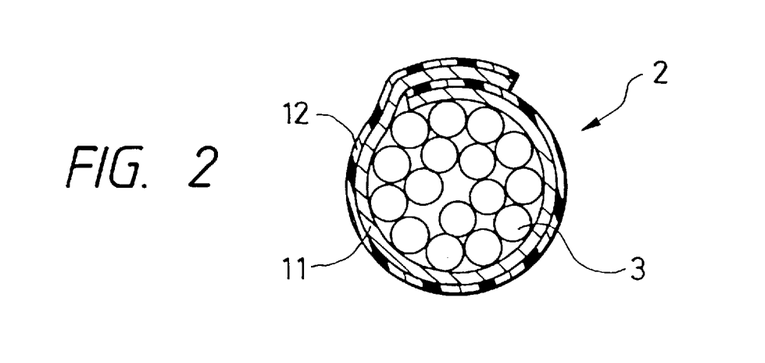
FIG. 2 is a cross-sectional view taken along the line II—II of FIG. 1.
Figure 3:
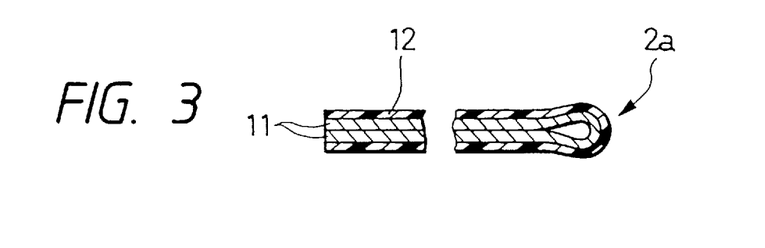
FIG. 3 is a cross-sectional view taken along the line III—III of FIG. 1.
Figure 4:
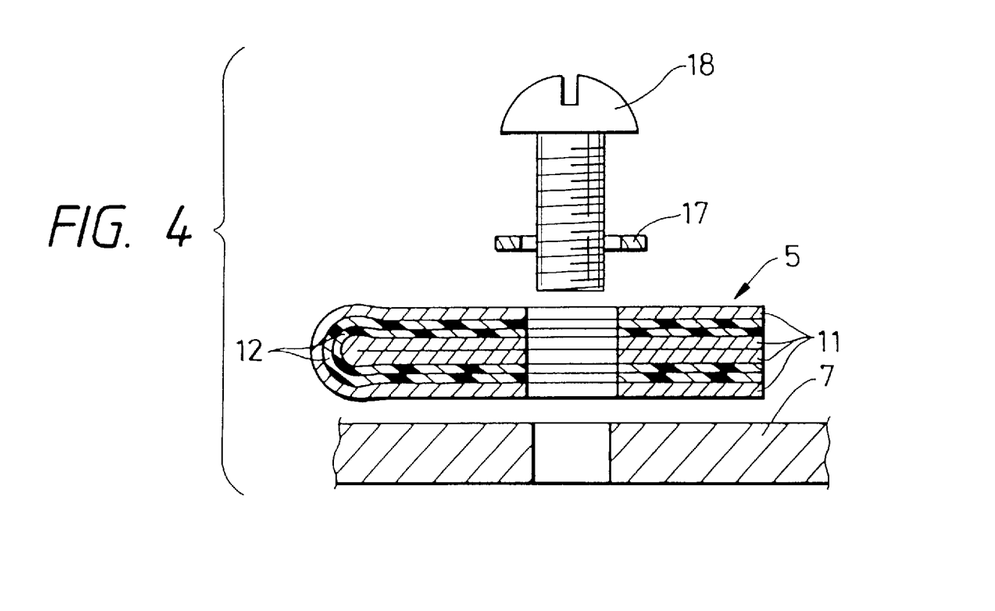
FIG. 4 is a cross-sectional view taken along the line IV—IV of FIG. 1.
Figure 5:
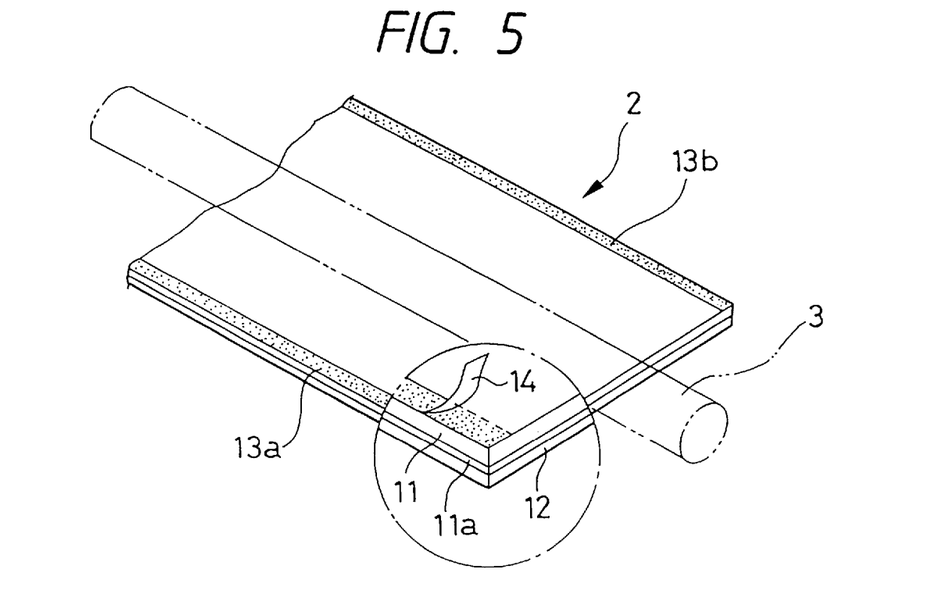
FIG. 5 is a perspective view showing the construction of a shield member.
Figure 6:
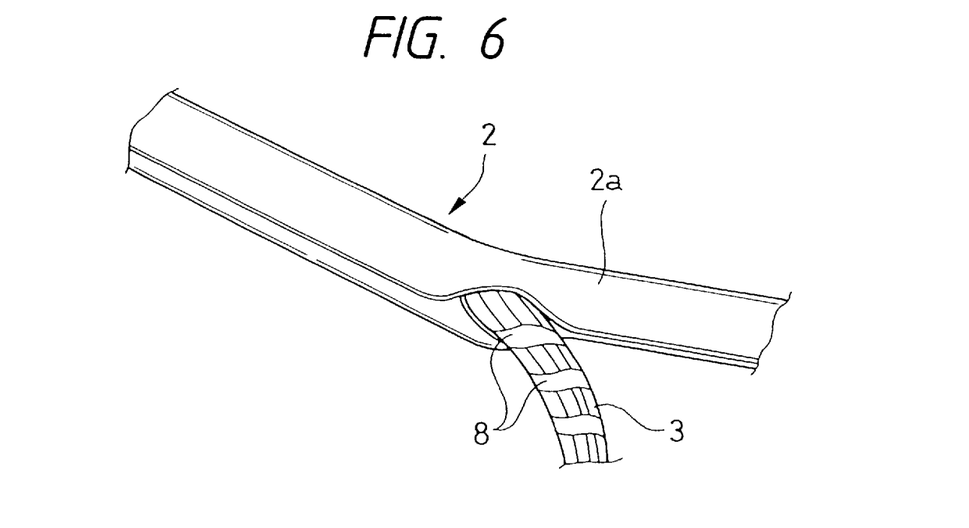
FIG. 6 is a perspective view showing a construction of a wire lead-out position and a lead wire portion.
Figure 7:
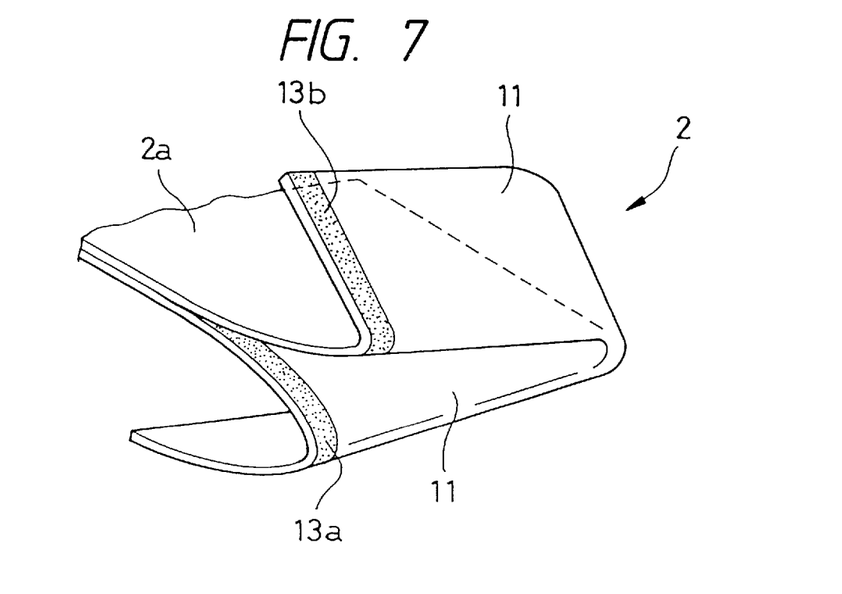
FIG. 7 is a perspective view showing the process of forming an earth terminal.
Figure 8:
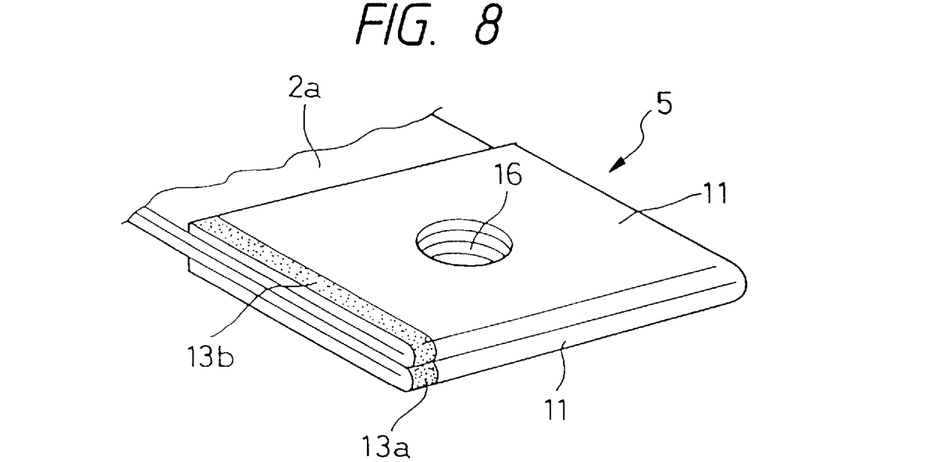
FIG. 8 is a perspective view showing the construction of the earth terminal.
Figure 9:
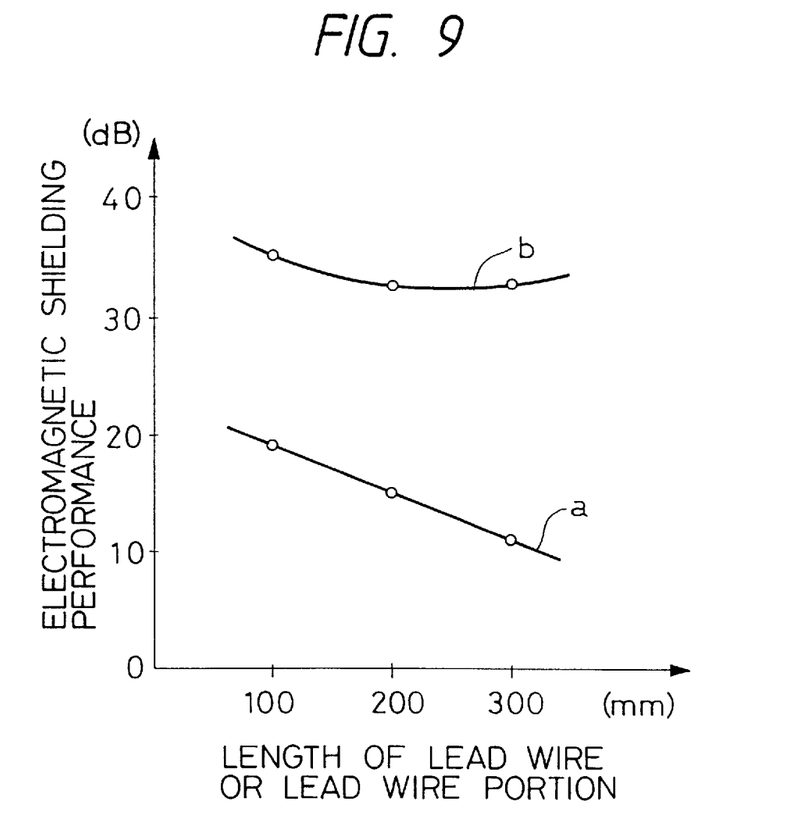
FIG. 9 is a characteristic diagram showing electromagnetic shielding effects.

A preferred embodiment of a wire shield structure (hereinafter referred to merely as "shield structure") of the present invention will now be described with reference to FIGS. 1 to 9. FIG. 1 is a perspective view showing the preferred embodiment of the shield structure of the invention, FIGS. 2 and 3 are cross-sectional views showing the construction of the shield structure, FIG. 4 is a cross-sectional view showing the construction of a shield end, FIG. 5 is a perspective view showing the shield structure, FIG. 6 is a perspective view showing a construction of a wire lead-out position, FIG. 7 is a perspective view showing the process of forming the shield end, FIG. 8 is a perspective view showing the construction of the shield end, and FIG. 9 is a characteristic diagram showing shielding effects.

In the description of this embodiment, an example of application of the shield structure will be first described, and then the construction and operation of the shield structure will be described.

The shield structure 1 of this embodiment is used for effecting an electromagnetic shielding of a wire harness or the like installed in an automobile.

As shown in FIGS. 1 to 4, in the shield structure 1, wires 3 are covered with a flexible shield member 2, and the wires 3 are led out of a desired portion of the shield member 2, and are connected to a connector 4, and an earth terminal 5 is formed on a distal end of a lead wire portion 2a formed by folding an end portion of the shield member 2 in a longitudinal direction. The earth terminal 5 is grounded to a body (chassis) 6 of the automobile or a shield case 7 for electronic equipment.

As shown in FIG. 5, the shield member 2 is in the form of a band-like, thin sheet, and the configuration of the shield member 2 is sequentially changed during the process of mounting the shield member on the wires. Referring first to the construction of the shield member 2, a reinforcement insulating layer 11a and a band-like insulating layer 12 are laminated on a band-like metal foil layer 11 made, for example, of copper or aluminum. The reinforcement insulating layer 11a reinforces the metal foil layer 11, and the insulating layer 12 is made of a soft synthetic resin or the like. Band-like adhesive layers 13a and 13b are formed respectively on opposite widthwise end portions of the surface of the metal foil layer 11. In the drawings except FIG. 5, the showing of the reinforcement insulating layer 11a is omitted for illustration purposes, the surface of each of the adhesive layers 13a and 13b is covered with a peelable sheet 14 before the shield member 2 is mounted, and when mounting the shield member 2, these peelable sheets 14 are removed as shown in an enlarged portion of FIG. 5.

For mounting the shield member 2, the wires 3 are positioned on the metal foil layer 11 as indicated in phantom in FIG. 5, and then the shield member 2 is wound on the wires 3. The wires 3 are beforehand combined together into a wire harness by a tape 8 as shown in FIGS. 1 and 6, and the shield member 2 is wound around this wire harness.

At a region where the wires 3 are covered with the shield member 2, the bundle of wires 3 is covered with the shield member 2 over an entire periphery thereof as shown in FIG. 2 which is a cross-sectional view taken along the line II—II of FIG. 1.

As shown in FIG. 2 in which the showing of the tape 8 and the adhesive layers 13a and 13b is omitted, one widthwise end portion of the shield member 2 is bonded to the surface of the bundle of wires 3 by the adhesive layer, and the other widthwise end portion of the shield member 2 is disposed on the insulating layer, and is bonded thereto by the adhesive layer. Therefore, the wires 3 and the shield member 2 are firmly joined together. Since the shield member 2 is in the form of a thin sheet, the bundle of wires 3, covered with the shield member 2, can be easily bent, and hence can be easily handled when installing it in the automobile. The bundle of wires 3 is completely covered with the shield member 2, and therefore when the metal foil layer 11 is grounded, a complete electromagnetic shielding is achieved.

The connector 4 is connected to the wires 3 as shown in FIG. 1, and therefore it is necessary to lead the wires 3 out of the shield member 2 at a desired position. With this construction of the shield member 2, this lead-out operation is quite easy, and this can be effected merely by leading the wires 3 from a joint portion of the shield member 2 as shown in FIG. 6. FIG. 6 shows the wire lead-out portion as seen from that side opposite to the side of FIG. 1. That portion, extending from this lead-out portion in a branched manner, corresponds to the lead wire portion 2a described below.

The lead wire portion 2a and the earth terminal 5 are formed in the following manner.

First, the extension portion to form the lead wire portion 2a is held in an open or expanded condition, and its distal end portion is folded back as shown in FIG. 7, so that the metal foil layer 11 is exposed at the opposite sides (upper and lower sides in FIG. 7) of the distal end portion. Then, the extension portion, including the folded portion, is folded in the longitudinal direction to be bonded by the adhesive layers 13a and 13b.

Accordingly, the width of the extension portion is a half of the initial width of the shield member 2, and this folded portion corresponds to the lead wire portion 2a. A cross-sectional structure of this lead wire portion 2a is shown in FIG. 3 which is a view taken along the line III—III of FIG. 1.

The distal end portion is folded in four as shown in FIGS. 7 and 8, and a screw passage hole 16 is formed through a central portion of this distal end portion, thus forming the earth terminal 5. A cross-sectional structure of this earth terminal 5 is shown in FIG. 4 which is a view taken along the line IV—IV of FIG. 2.

In the above manner, as shown in FIG. 1, the wires 3 are covered with the shield member 2, and the lead wire portion 2a and the earth terminal 5 are formed, and the connector 4 is connected to the wires 3, thus forming the wire shield structure 1. As shown in FIG. 4, the earth terminal 5 is fixedly connected to the body 6 (not shown) or the shield case 7 by a screw 18 through a washer 17.

In this construction, the wires 3 are covered with the shield member 2, and the metal foil layer 11 of the shield member 2 is grounded through the lead wire portion 2a and the earth terminal 5. Therefore, the wires 3 are completely shielded from electromagnetic waves, and besides since the metal foil layer 11 is covered with the insulating layer 12, the metal foil layer 11 will not be damaged during and after the assembly, and the good shielding effect is secured.

Here, the shielding effect of the shield structure 1 of this embodiment will be compared with that of the conventional structure. A characteristic a, shown in FIG. 9, indicates the degree of attenuation of electromagnetic waves achieved when a lead wire for grounding purposes is connected to a metal foil as in the conventional structure, and it will be appreciated that the electromagnetic shielding performance is degraded in accordance with the length of the lead wire.

On the other hand, in the shield structure 1 of this embodiment, it has become clear that when the length of the lead wire portion 2a is set to 200 mm and 300 mm, the attenuation is about 33 dB, and that when the length is set to 100 mm, the attenuation is improved to 36 dB. Therefore, in the shield structure 1, the shielding effect is greatly improved as indicated by a characteristic b. Incidentally, when the length of the lead wire portion 2a was set to 80 mm, the attenuation was improved to 37 dB even if the frequency was 500 KHz, and also the attenuation was improved to 40 dB when the frequency was 1 MHz and 2 MHz.

In the comparison between the conventional structure and the shield structure 1 of this embodiment shown in FIG. 9, the metal foils made of aluminum were used as an example, respectively.

As described above, in the shield structure 1 of this embodiment, any lead wire is not used, and instead the metal foil layer 11 is extended to form the lead wire portion 2a, and with this construction the electromagnetic shielding effect is greatly enhanced. And besides, the number of the component parts can be reduced, and the efficiency of the assembling operation is enhanced, and therefore there can be obtained the shield structure which is less costly, and is excellent in electromagnetic shielding.

As described above, in the wire shield structure of the present invention, the wires are covered with the shield member formed by laminating the metal foil layer and the insulating layer together, and the wires are led out of the shield member, and are connected to the desired equipment, and the extension portion of the shield member is folded, with the metal foil layer disposed at the inside, to form the lead wire portion, and the distal end portion of this lead wire portion is folded back in such a manner that the metal foil layer is exposed to provide the earth terminal for grounding purposes. Therefore, the lead wire portion and the earth terminal for grounding the metal foil layer are integral with the metal foil layer, and a separate lead wire and a separate earth terminal are not necessary.

Therefore, the number of the component parts, as well as the time and labor for the assembling operation, is reduced, and the cost can be reduced. And besides, a lead wire is not required, the electromagnetic shielding is greatly improved, and the reliability of the apparatus, such as an automobile, provided with this shield structure, is markedly enhanced.

The earth terminal is formed by that portion of the metal foil layer exposed at the opposite sides, and therefore an error in the connection for grounding purposes will not occur, so that the electromagnetic shielding is positively achieved. And besides, the metal foil layer is not exposed except at the earth terminal, and therefore will not be damage during the installation of the wires, and this also contributes to the enhanced reliability.

What is claimed is:

1. A wire shield structure, comprising:
   a shield member, formed into a band-like shape, including an insulating layer and a metal foil layer laminated on said insulating layer wherein said shield member covers a wire in such a manner that said wire extends along said shield member in a longitudinal direction, one end portion of said wire is led out from a desired portion of said shield member, a distal end portion of said shield member is folded back so that a part of said metal foil layer is exposed, and the exposed portion of said metal foil layer is grounded, thereby shielding said wire from electromagnetic waves.

2. The wire shield structure of claim 1, wherein said shield member further includes a lead wire portion, having said distal end portion, and extending from the desired portion of said shield member from which said wire is led out to the exposed portion, which is folded in the longitudinal direction, with said metal foil layer disposed at an inner side, and wherein said lead wire portion is formed integrally with said metal foil layer.

3. A shield structure for a wire, comprising:
   a shield member, formed into a band-like shape by an insulating layer and a metal foil layer laminated on said insulating layer, including:
      a wire shielding portion covering entirely a portion of said wire;
      a wire lead-out portion from which said wire is led out from said shield member;
      an earth connecting portion formed by folding said shield member in a longitudinal direction with said metal foil layer disposed at an inner side of said shield member; and
      an exposed portion provided to expose a part of said metal foil layer by folding back a distal end portion of said earth connecting portion, said exposed portion being grounded.

4. The shield structure of claim 3, wherein said shield member further includes adhesive layers formed respectively on opposite widthwise edge portions of said metal foil layer.

* * * * *